United States Patent
Evans et al.

(10) Patent No.: US 8,971,682 B2
(45) Date of Patent: Mar. 3, 2015

(54) FEW MODE OPTICAL FIBERS

(71) Applicant: Corning Incorporated, Corning, NY (US)

(72) Inventors: Alan Frank Evans, Beaver Dams, NY (US); Andrey Evgenievich Korolev, St. Petersburg (RU); Dmitri Vladislavovich Kuksenkov, Big Flats, NY (US); Snigdharaj Kumar Mishra, Wilmington, NC (US); Vladimir Nikolaevich Nazarov, St. Petersburg (RU); William Allan Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 215 days.

(21) Appl. No.: 13/775,953

(22) Filed: Feb. 25, 2013

(65) Prior Publication Data
US 2013/0230290 A1    Sep. 5, 2013

Related U.S. Application Data

(60) Provisional application No. 61/605,373, filed on Mar. 1, 2012.

(51) Int. Cl.
G02B 6/028    (2006.01)
G02B 6/00     (2006.01)
G02B 6/036    (2006.01)

(52) U.S. Cl.
CPC .................................. *G02B 6/0288* (2013.01)
USPC .............................. 385/124; 385/11; 385/127

(58) Field of Classification Search
USPC ............................ 385/11, 123–128, 141–145
See application file for complete search history.

(56) References Cited

U.S. PATENT DOCUMENTS

| 4,715,679 A | 12/1987 | Bhagavatula |
| 4,889,404 A | 12/1989 | Bhagavatula et al. |

(Continued)

FOREIGN PATENT DOCUMENTS

EP    2292566    3/2011

OTHER PUBLICATIONS

Yaman, F. et al., "10 x 112Gb/s PDM-QPSK transmission over 5032 km in few-mode fibers", Optics Express, vol. 18, No. 20, pp. 21342-21349, Sep. 22, 2010.

(Continued)

*Primary Examiner* — Akm Enayet Ullah
*Assistant Examiner* — Michael Mooney
(74) *Attorney, Agent, or Firm* — Svetlana Short

(57) ABSTRACT

A few mode optical fiber comprising:
  a Ge-free core having an effective area Aeff of $LP_{01}$ mode wherein 120 $\mu m^2$<Aeff<1000 $\mu m^2$ at 1550 nm, and a refractive index profile selected such that the core is capable of supporting the propagation and transmission of an optical signal with X number of LP modes at 1550 nm, X is an integer and 1<X≤20, maximum refractive index delta of the core, $\Delta_0$, wherein −0.5%≤$\Delta_0$≤0.08%; and,
  an annular cladding surrounding the core having a low index ring with a minimum refractive index delta $\Delta r_{MIN}$, $\Delta r_{MIN}$<$\Delta_0$ and $\Delta r_{MIN}$≤−0.3 relative to pure $SiO_2$, an outer cladding with a refractive index delta $\Delta_{Outer-Clad}$, such that $\Delta_{Outer-Clad}$>$\Delta r_{MIN}$; and |$\Delta_0$−$\Delta_{Outer-Clad}$|>0.05%, the relative refractive index profile of the optical fiber is selected to provide attenuation of <0.18 dB/km at the 1550 nm, and $LP_{11}$ cut off wavelength >1600 nm.

21 Claims, 4 Drawing Sheets

(56) References Cited

U.S. PATENT DOCUMENTS

| | | |
|---|---|---|
| 6,326,416 B1 | 12/2001 | Chien et al. |
| 6,418,256 B1 | 7/2002 | Danziger et al. |
| 6,531,522 B1 | 3/2003 | Winningham |
| 6,539,152 B1 | 3/2003 | Fewkes et al. |
| 6,563,996 B1 | 5/2003 | Winningham |
| 6,869,981 B2 | 3/2005 | Fewkes et al. |
| 7,010,206 B1 | 3/2006 | Baker et al. |
| 7,088,900 B1 | 8/2006 | Mishra |
| 7,095,940 B2 | 8/2006 | Hayami et al. |
| 7,221,842 B2 | 5/2007 | Baker et al. |
| 7,423,105 B2 | 9/2008 | Winningham |
| 7,426,327 B2 | 9/2008 | Mishra |
| 7,483,612 B2 | 1/2009 | Digiovanni et al. |
| 7,689,085 B1 | 3/2010 | Mishra |
| 7,929,818 B1 | 4/2011 | Bickham et al. |
| 2002/0164140 A1 | 11/2002 | Lysiansky et al. |
| 2010/0103978 A1 | 4/2010 | Lee et al. |

OTHER PUBLICATIONS

Jeunhomme, Single Mode Fiber Optics, Marcel Dekker, New York, 1990, pp. 39-44.

Lenahan, T.A., "Calculation of modes in an optical fiber using a finite element method and EISPACK," Bell Syst. Tech, J vol. 62, No. 9, part 1. p. 2663-2694, Nov. 1983).

US 8,971,682 B2

FEW MODE OPTICAL FIBERS

This application claims the benefit of priority under 35 U.S.C. §119 of U.S. Provisional Application Ser. No. 61/605,373 filed on Mar. 1, 2012 the content of which is relied upon and incorporated herein by reference in its entirety.

FIELD

The present specification generally relates to optical fibers and, more specifically, to large effective area, few moded optical fibers with low attenuation.

BACKGROUND

The explosive growth in the volume and variety of multimedia telecommunication applications continues to drive speed demands for internet traffic and motivate research in backbone fiber-optic communication links Coherent communications and electronic digital signal processing (DSP)-based receivers have been accepted in recent years as the next—generation standards for long-haul systems due to their flexibility, scalability and ability to compensate for various transmission impairments, including fiber nonlinearity.

However, the proposed DSP algorithms for nonlinearity mitigation are not anticipated to provide orders-of-magnitude performance improvements. Consequently, new transmission media and multiplexing/demultiplexing techniques may need to replace standard single-mode fibers to achieve transmission performance beyond what the DSP algorithms can provide.

To exploit the remaining capacity in optical fiber, advanced multi-level modulation formats, such as QAM, and/or super-channel OFDM systems will be needed. However these systems require higher signal-to-noise ratios (SNR) than are currently feasible. However these systems require higher signal-to-noise ratios (SNR) than are currently feasible. Fiber nonlinearities and fiber attenuation are the key performance limitations that prevent the higher SNRs from being achieved.

Another solution is needed to increase system capacity. Recent experiments have demonstrated that it is possible to transmit signals in more than one spatial propagation mode of a FMF using multiple-input multiple-output (MIMO) techniques. However, because of their relatively large effective areas, few moded fibers also have increased levels of attenuation, thus making it difficult to achieve the desired high power signal levels.

SUMMARY

According to some embodiments described herein a few mode optical fiber comprises:

(i) a Ge free core having an effective area Aeff of $LP_{01}$ mode such that $120\ \mu m^2 \leq Aeff \leq 1000\ \mu m^2$ at 1550 nm, and a refractive index profile selected such that (a) the core is capable of supporting the propagation and transmission of an optical signal with X number of LP modes at a wavelength of 1550 nm, wherein X is an integer greater than 1 and not greater than 20, and (b) maximum refractive index delta of the core, $\Delta_0$ in % measured relative to pure $SiO_2$, wherein $-0.5\% \leq \Delta_0 \leq 0.08\%$; and (ii)) an annular cladding surrounding the core, said annular cladding having a low index ring with a minimum refractive index delta $\Delta r_{MIN}$, where (a) $\Delta r_{MIN} < \Delta_0$ and (b) $\Delta r_{MIN} \leq -0.3$ measured relative to pure $SiO_2$, and an outer cladding with a refractive index delta $\Delta_{Outer-Clad}$ relative to pure silica, such that $\Delta_{Outer-Clad} > \Delta r_{MIN}$; and the difference between the relative refractive index of the core $\Delta_0$ and the outer cladding $\Delta_{Outer-Clad}$ is $|\Delta_0 - \Delta Outer-Clad| > 0.05\%$, and wherein the relative refractive index profile of the few mode optical fiber is selected to provide attenuation of less than 0.18 dB/km at the 1550 nm wavelength, and $LP_{11}$ cut off wavelength is greater than 1600 nm.

Preferably, in some embodiments $LP_{11}$ cut off wavelength is greater than 1700 nm, more preferably greater than 1800 nm. In some embodiments $LP_{11}$ cut off wavelength is greater than 2000 nm. Preferably $|\Delta_0 - \Delta_{Outer-Clad}| > 0.1\%$, more preferably $|\Delta_0 - \Delta_{Outer-Clad}| > 0.2\%$.

Preferably the core provides a difference in effective indices between $LP_{01}$ and $LP_{11}$ modes of more than $10^{-4}$. Preferably, the difference in $LP_{02}$ and $LP_{11}$ cut off wavelengths is greater than 500 nm, more preferably greater than 700 nm. In some embodiments the Effective Area, Aeff, of $LP_{01}$ mode is not less than 150 $\mu m^2$ at 1550 nm. Preferably, core alpha a is either less than 1.5, or $12 \leq \alpha \leq 25$. In some embodiments the core is a multi-segment core.

According to the embodiments described herein a few mode optical fiber comprises:

(i) a Ge free step index core having an effective area of $LP_{01}$ mode $Aeff > 150\ \mu m^2$ at 1550 nm, and a refractive index profile selected such that (a) the core is capable of supporting the propagation and transmission of an optical signal with X number of LP modes at a wavelength of 1550 nm, wherein X is an integer greater than 1 and not greater than 20, (b) a difference in effective indices between $LP_{01}$ and $LP_{11}$ modes of more than $10^{-4}$, and (c) maximum refractive index delta of the core, $\Delta_0$, relative to pure $SiO_2$ is $-0.5\% \leq \Delta_0 \leq 0.08\%$;

(ii) an annular cladding surrounding the core, said annular cladding having a low index ring with a minimum refractive index delta $\Delta r_{MIN}$, where $\Delta r_{MIN} < \Delta_0$ and an outer cladding with a refractive index delta $\Delta_{Outer-Clad}$ relative to pure silica, such that $\Delta_{Outer-Clad} > \Delta r_{MIN}$ and the difference between the relative refractive index of the core $\Delta_0$ and the outer cladding $\Delta_{Outer-Clad}$ is $|\Delta_0 - \Delta_{Outer-Clad}| > 0.05\%$, wherein the relative refractive index profile of the few mode optical fiber is selected to provide attenuation of less than 0.18 dB/km at the 1550 nm wavelength. Preferably $0.5\% > |\Delta_0 - \Delta_{Outer-Clad}| > 0.1\%$, for example, $0.5\% > \Delta_0 - \Delta_{Outer-Clad} > 0.1\%$.

Preferably $1 < X < 20$. According to some embodiments $1 < X < 10$. More preferably $1 < X < 5$. According to some embodiments the refractive index profile of said core is constructed to provide a theoretical $LP_{11}$ cutoff wavelength greater than 2.1 $\mu m$.

According to some embodiments, the optical fiber core and said annual cladding are structured to provide a $LP_{02}$ cutoff wavelength below operating wavelength. In some embodiments, the $LP_{02}$ cutoff wavelength is less than 2000 nm. In some embodiments, the $LP_{02}$ cutoff wavelength is less than 1600 nm. In some embodiments, the $LP_{02}$ cutoff wavelength is less than 1550 nm. Preferably the operating wavelength is about 1550 nm.

According to some embodiments the optical fiber core is a glass core, and the cladding is a glass cladding. The core comprises: a radius $R_1$ from about 4.5 $\mu m$ to about 15 $\mu m$. The core supports the propagation and transmission of the $LP_{01}$ and $LP_{11}$ modes at wavelengths greater than 1530 nm. In some embodiments, a theoretical cutoff wavelength of the $LP_{02}$ mode is less than about 1800 nm, so that that only the $LP_{01}$ and $LP_{11}$ modes propagate in the 1550 nm window. The $LP_{01}$ effective area is greater than 150 $\mu m^2$, preferably greater than 150 $\mu m^2$ (e.g., $\geq 175\ \mu m^2$, or $\geq 200\ \mu m^2$). Preferably, according to some embodiments, the $LP_{01}$ effective area at 1550 nm is between 150 $\mu m^2$ and 250 $\mu m^2$. The glass cladding comprises a maximum relative refractive index $\Delta_{Clad}$ and preferably (according to at least some embodiments) $\Delta_0 > \Delta_{Clad}$. More preferably $\Delta_0 - \Delta_{Clad} > 0.1\%$. In some embodiments, the differential delay between the $LP_{01}$ and $LP_{11}$ modes is less than about 0.5 ns/km (e.g., ≤0.3 ns/km, ≤0.1 ns/km, or ≤0.05 ns/km) at a wavelength of 1550 nm.

According to some embodiments the core supports the propagation and transmission of the $LP_{01}$ and $LP_{11}$ modes at wavelengths greater than 1530 nm, and in some embodiments, a theoretical cutoff wavelength of the $LP_{02}$ mode is less than about 1800 nm (e.g., less than 1600 nm, or less than 1550 nm, or not greater than 1500 nm). In some embodiments a theoretical cutoff wavelength of the $LP_{11}$ mode may be greater than 1800 nm, for example greater than 2250 nm. The $LP_{01}$ effective area is greater than about 150 μm². According to some embodiments the relative delay between the $LP_{01}$ and $LP_{11}$ modes is less than about 0.5 ns/km (e.g., ≤0.3 ns/km, or ≤0.1 ns/km, or ≤0.05 ns/km) at a wavelength of 1550 nm.

According to some embodiments the optical fiber comprises a step index refractive index profile, wherein the core is a glass core, and the cladding is a glass cladding. The glass cladding has a low-index ring surrounding the core. The low-index ring has a minimum relative refractive index $\Delta r_{MIN} < 0$. The glass cladding also has an outer cladding layer surrounding the low-index ring and having a maximum relative refractive index $\Delta_{Clad}$ such that $\Delta_0 > \Delta_{Clad} > \Delta \Delta r_{MIN}$. The core supports the propagation and transmission of the $LP_{01}$ and $LP_{11}$ modes at wavelengths greater than 1530 nm and in some embodiments, a theoretical cutoff wavelength of the $LP_{02}$ mode is less than about 1800 nm. The $LP_{01}$ effective area is greater than about 150 μm². Preferably, the $LP_{01}$ effective area is between 150 μm² and 250 μm². Preferably, according to at least some embodiments, the relative delay between the $LP_{01}$ and $LP_{11}$ modes is less than about 0.5 ns/km (e.g. ≤0.3 ns/km, or ≤0.1 ns/km, or ≤0.05 ns/km) at a wavelength of 1550 nm. According to some embodiments, the relative delay between the $LP_{01}$ and $LP_{11}$ modes is less than about 0.3 ns/km at all wavelengths between 1530 and 1570 nm. According to other embodiments, the relative delay between the $LP_{01}$ and $LP_{11}$ modes is less than about 0.1 ns/km at all wavelengths between 1530 and 1570 nm. In some embodiment the MPI is less than −30 dB at a wavelength of 1550 nm. In some embodiments the MPI is less than −35 dB at a wavelength of 1550 nm.

Fibers made according to some of the exemplary embodiments of the invention provide low attenuation for the $LP_{01}$ and $LP_{11}$ modes. According to some embodiments, the $LP_{01}$ attenuation is less than 0.18 dB/km at a wavelength of 1550 nm. According to other embodiments, the $LP_{01}$ attenuation is less than 0.17 dB/km at a wavelength of 1550 nm. Preferably, the $LP_{01}$ attenuation is less than 0.16 dB/km at a wavelength of 1550 nm. According to some embodiments, the $LP_{11}$ attenuation is less than 0.25 dB/km at a wavelength of 1550 nm. Preferably $LP_{11}$ attenuation is less than 0.18 dB/km at a wavelength of about 1550 nm.

Additional features and advantages of the disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
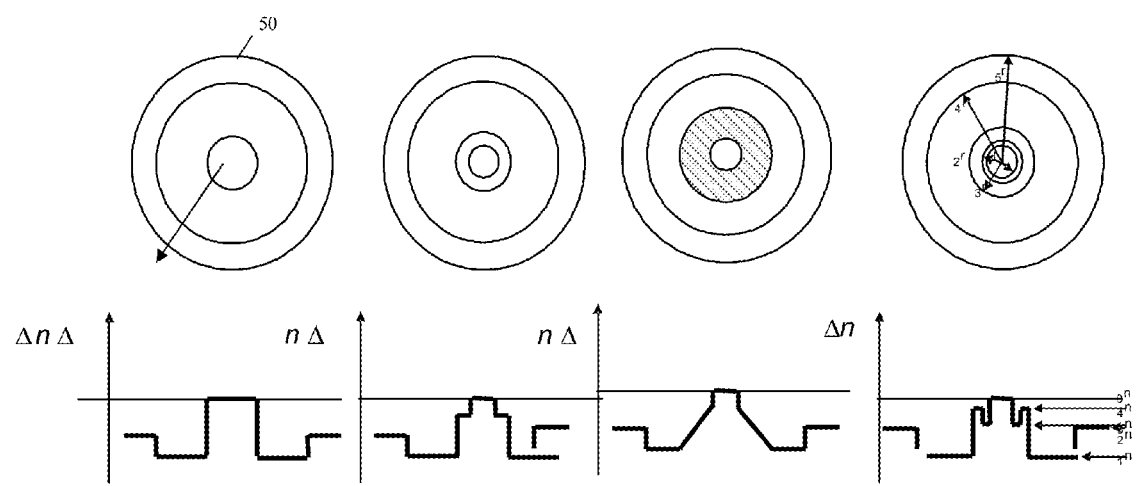
FIG. 1 schematically depicts cross sections of an optical fiber according to some embodiments described herein; and their corresponding exemplary relative refractive index profiles.
Figure 2:
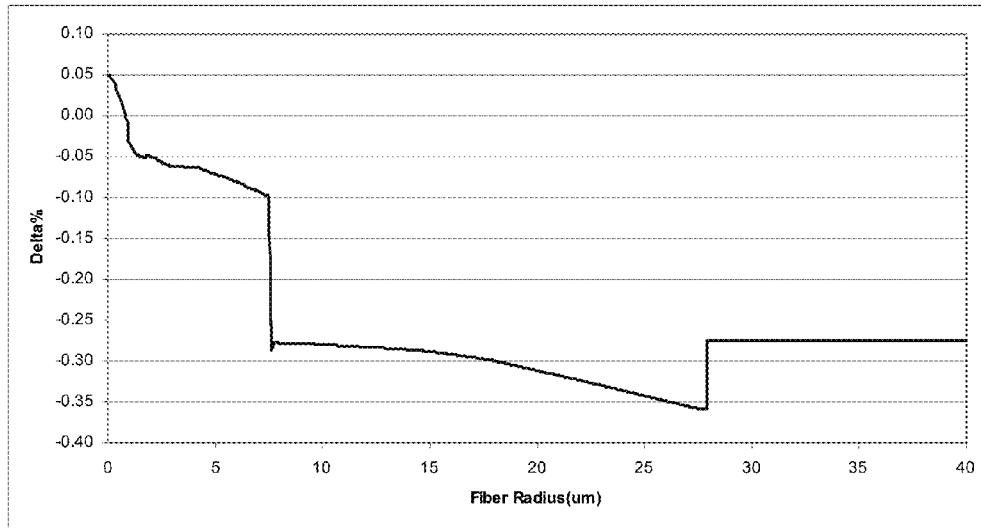
FIGS. 2-6 are relative refractive index profiles of several exemplary embodiments of the optical fiber.
Figure 3:
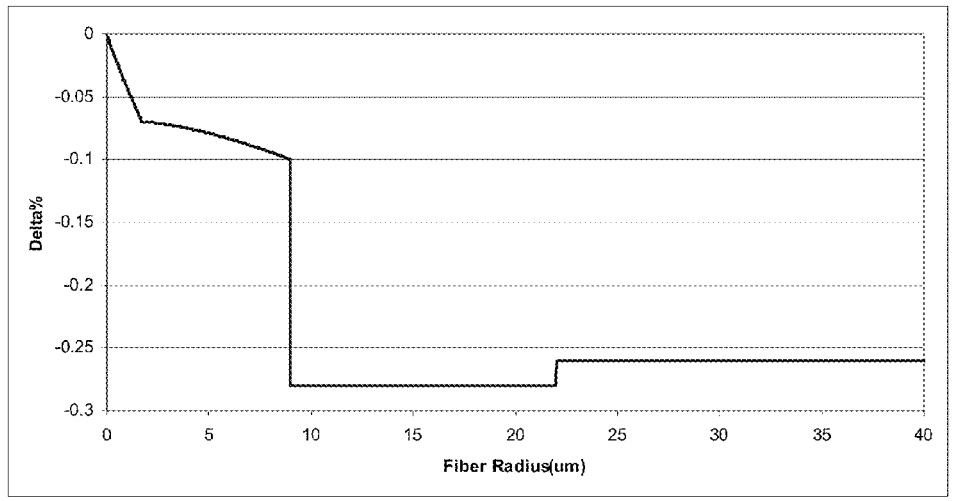
Figure 4:
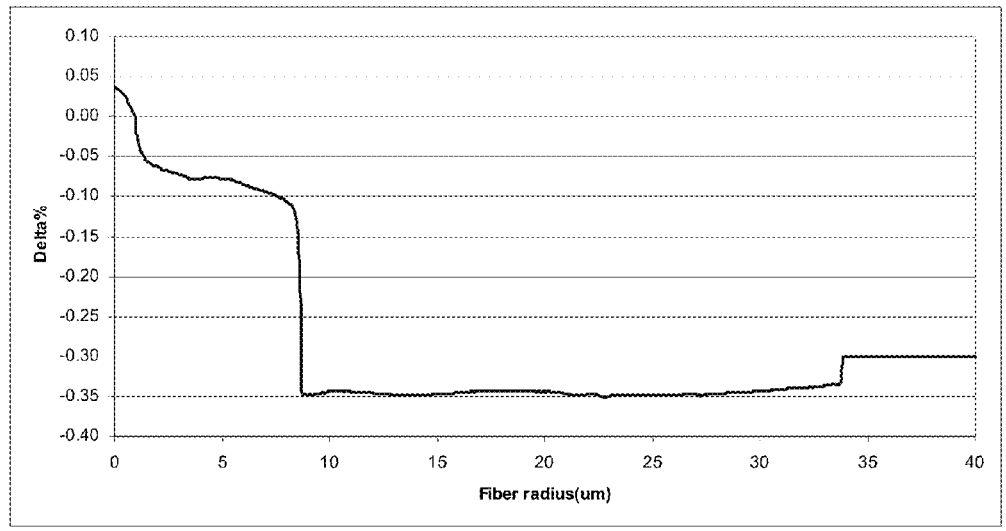
Figure 5:
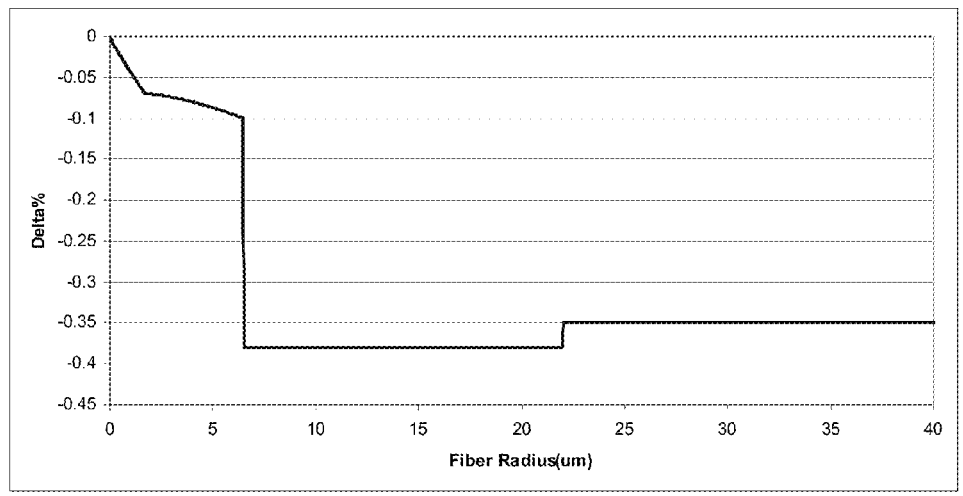
Figure 6:
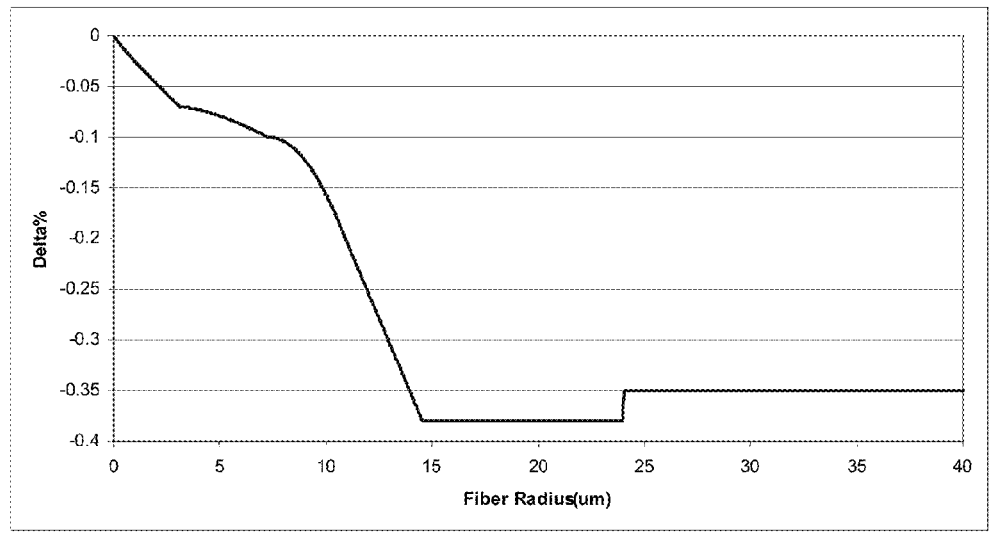

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," as used herein, is defined as:

$$\Delta(r) = [n(r)^2 - n_{REF}^2]/2n_{REF}^2,$$

where n(r) is the refractive index at radius r, unless otherwise specified. The relative refractive index is defined at 1550 nm unless otherwise specified. The reference index $n_{REF}$ is pure silica glass, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" $A_{eff}$ of an optical fiber is the area of the optical fiber in which light is propagated and is defined as:

$$A_{\text{eff}} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. The effective area is determined at a wavelength of 1550 nm, unless otherwise specified.

Mode field diameter (MFD) is a measure of the spot size or beam width of light propagating in a single mode fiber. Mode-field diameter is a function of the source wavelength, fiber core radius and fiber refractive index profile. MFD is determined using the Peterman II method where $$MFD = 2w, \text{ and}$$

$$w^2 = 2 \frac{\int_0^\infty E^2 r\, dr}{\int_0^\infty \left(\frac{dE}{dr}\right)^2 r\, dr}$$

where E is the electric field distribution in the fiber and r is the radius of the fiber.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the $LP_{11}$ mode. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

The cabled cutoff wavelength, or "cabled cutoff" can be approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test. The cabled cutoff wavelength of an optical fiber is typically 100-300 nm lower than a theoretical cutoff wavelength.

As used herein, the term "few moded fiber" refers to a fiber supporting the propagation of more modes than a single mode fiber but fewer modes than a normal multimode fiber (i.e., not greater than 20 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983).

Light traveling in an optical fiber or other dielectric waveguide forms hybrid-type modes, which are usually referred to as LP (linear polarization) modes. The LP0p modes have two polarization degrees of freedom and are two-fold degenerate, the LP1p modes are four-fold degenerate with two spatial and two polarization degrees of freedom, and the LPmp modes with m>1 are also four-fold degenerate. We do not count these degeneracies when we designate the number of LP modes propagating in the fiber. For example, an optical fiber in which only the $LP_{01}$ mode propagates is a single-mode fiber, even though the $LP_{01}$ mode has two possible polarizations. A few-moded optical fiber in which the $LP_{01}$ and $LP_{11}$ modes propagate supports three spatial modes since the $LP_{11}$ mode is two-fold degenerate, and each mode also has two possible polarizations, giving a total of 6 modes. Thus, when a fiber is said to have two LP modes, it is meant that the fiber supports the propagation of all of the $LP_{01}$ and $LP_{11}$ modes.

The bend resistance or bend performance of an optical fiber may be measured by the induced attenuation of light propagating through the fiber under prescribed test conditions. The bend performance of the optical fibers described herein is determined using the pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of Δ which is in units of "%", where r is the radius and which follows the equation, $$\Delta = \Delta_0 \left[ 1 - \left(\frac{r}{R_1}\right)^\alpha \right],$$

where $\Delta_0$ is the maximum relative refractive index, $R_1$ is the radius of the core, r is in the range $r_i \leq r \leq r_f$, Δ is as defined above, $r_i$ is the initial point of the α-profile, $r_f$ is the final point of the α-profile, and α is a real number exponent. For a step index profile, the alpha value is greater than or equal to 10. As defined herein, for a graded index profile, the alpha value is less than 1.8<α<2.3.

Unless otherwise specified herein, the above-referenced properties of the optical fiber disclosed herein and discussed below are measured or modeled at 1550 nm.

FIG. 1 is a side view of a section for four low loss few mode optical fiber ("fiber") 10 embodiments according to the disclosure and their corresponding refractive index profiles The various example embodiments of fiber 10 are now described below with respect to cross-sectional views of the fiber and plots of the corresponding refractive index profiles.

The optical fiber 10 comprises Ge-free silica based core 20, a cladding 50, and at least one coating 60 (not shown) surrounding the glass cladding 50. The relative refractive index of the core 20 preferably has essentially a step index profile. The core 20 is a few moded core, which is defined herein as a core that propagates more than 1 and no more than 20 optical modes. That is, core 20 supports the propagation and transmission of an optical signal with X number of LP modes at a wavelength of 1550 nm, wherein X is an integer greater than 1 and not larger than 20, for example X=19, X=16, X=12, X=10, X=9, X=6, X=4, X=3 or X=2. In principle, the larger the number of modes is, the more information capacity will be. But if the number of mode is too large, it is difficult to design modal division multiplexing/demultiplexing components to separate the modes. In addition, mode coupling among the modes becomes a problem. A number of modes between 2 and 20 is an optimum choice. Preferably the number of modes is 2 to 10. More preferably the number of modes is 2 to 5. The core index profile may be, for example, a step profile and/or a "triangular" profile—i.e., ($\alpha$>10, and/or $\alpha$<1.5).

Preferably the core 20 provides a difference in effective indices between $LP_{01}$ and $LP_{11}$ modes of more than $10^{-4}$. Preferably, the difference in $LP_{02}$ and $LP_{11}$ cut off wavelengths is greater than 500 nm, more preferably greater than 600 nm, and even more preferably at least 700 nm. Preferably, to at least some embodiments, the relative refractive index profile of the few mode optical fiber 10 is structured to provide attenuation of less than 0.18 dB/km (e.g., 0.15 dB/km to 0.178 dB/km) at the 1550 nm wavelength. Preferably, according to at least some embodiments, the $LP_{11}$ cut off wavelength is greater than 1700 nm, more preferably greater than 1750 nm. Preferably, at least in some embodiments, the cutoff of the $LP_{11}$ mode is greater than 1800 nm, preferably greater than 2000 nm, more preferably greater than 2200 nm. Preferably, for good performance while maintaining a few-moded operation at 1550 nm, $\Delta_{Outer\text{-}Clad} - \Delta r_{MIN}| > 0.02\%$, more preferably $\geq 0.025\%$, more preferably $\geq 0.05\%$, (e.g., 0.07% to 0.2%).

The outer radius of the core 20 is $R_1$ and the outer radius of the cladding 50 is $R_{outer}$. The glass cladding 50 has a maximum refractive index delta $\Delta_{cladMAX}$. In the exemplary embodiments described herein $R_{outer} = 62.5$ μm.

Preferably, according to some embodiments, the numerical aperture NA of the fiber is greater than 0.15 and less than 0.3, for example between 0.15 and 0.25 or between 0.18 and 0.22, or between 0.15 and 0.2. An effective area Aeff of the $LP_{01}$ mode may be between about 120 μm² and 350 μm², for example between 150 μm² and 325 μm².

The first embodiment of optical fiber 10 is shown schematically on the left side of FIG. 1. This fiber embodiment has a step index core directly surrounded by a cladding with a low index ring 53 adjacent to the core 20, and the outer cladding 54 surrounding the lower index ring 53. In this embodiment the core index profile is a step profile ($\alpha$>10). To achieve a desired refractive index fiber profile, the cladding 50 is down-doped relative to the core 20. Preferably, the core 20 is essentially pure silica. However, the core 20 may also include a some alkali, for example potassium (e.g., <0.05 wt %, or 20 to 1000 ppm by weight) or chlorine (e.g. <0.05 wt %) to control its viscosity. The relative refractive index delta of the core 20 (relative to pure silica) of the optical fiber 10 is less than 0.08%, for example between −0.5% and 0.05%. Preferably, the low index ring 53 of the cladding 50 has a minimum relative refractive index delta (relative to pure silica) $\Delta r_{MIN}$ of less than −0.2%; for example less than −0.25%, less than −0.3% or −0.6%<$\Delta r_{MIN}$<−0.2%. The low index ring 53 can be made of glass doped with a index decreasing dopant such as F, or B. The outer cladding layer 54 may surround and directly contact the low index ring 53. Preferably $\Delta_{oMAX} \Delta_{cladMAX} > \Delta r_{MIN}$. Preferably $\Delta_{oMAX} > \Delta_{outer\ clad} > \Delta r_{MIN}$. In this embodiment the core $\alpha$ is $12 \leq \alpha \leq 25$.

The outer core radius $R_1$ is in the range of 3 μm≤$R_1$≤15 μm. The core radius $R_1$ is selected according to the core delta to support at least two modes at 1550 nm wavelength. Preferably the cutoff of the $LP_{11}$ mode is greater than 2000 nm, more preferably greater than 2100 nm, and preferably less than 4500 nm (e.g., 2100 nm, 2200 nm, 2500 nm, 3000 nm, or therebetween). An effective area $A_{eff}$ of the $LP_{01}$ is preferably between 120 μm² and 350 μm², preferably at least 150 μm² (e.g., 150 μm², 175 μm², 200 μm², or 225 μm², 250 μm², 275 μm², 300 μm², 325 μm2 or therebetween).

The second embodiment (second left) shown in FIG. 1 is similar to the first embodiment, but the core 20 of this fiber embodiment is a segmented core. In this embodiment, the core 20 includes two segments—a central core segment 20A and an outer core segment 20B. The outer core segment 20B is situated between the low index ring 53 and the central core segment 20A. In this embodiment, the maximum relative refractive index $\Delta_1$ of the outer core segment 20B is smaller than that of the central core region 20A, and higher than that of the low index ring 53. That is, outer core segment 20B may have a relative refractive index $\Delta_1$ such that $\Delta_{oMAX} \geq \Delta_1$, and $\Delta_{1MAX} \geq \Delta_2$, where $\Delta_{1MAX}$ is the maximum refractive index delta of the outer core segment 20B (relative to pure silica) and $\Delta_2$ is the refractive index delta of the low index ring layer 53. In this embodiment the low index ring 53 has a ring width Wr of $R_2-R_1$ and a minimum relative refractive index $\Delta r_{MIN} = \Delta_{2MIN}$. Preferably $\Delta_{2MIN}$ is between −0.1 and −0.7% (relative to pure silica), more preferably between −0.3 and −0.5%. The ring width Wr is preferably between 2 to 8 μm, more preferably between 4 to 6 μm.

The third embodiment shown in FIG. 1 (second from the right) is similar to the second embodiment, but the outer core segment 20B of this embodiment decreases (preferably monotonously) with the increasing radius. More specifically, the relative refractive index profile of the outer core segment 20B is triangular ($\alpha$<1.5). In this embodiment, the relative refractive index of the outer core segment 20B is smaller than that of the central core region 20A, and higher than that of the low index ring 53. That is, outer core segment 20B may have a relative refractive index $\Delta_1$ such that $\Delta_{oMAX} \geq \Delta_1$, and $\Delta_{1MAX} \geq \Delta_2$, where $\Delta_{1MAX}$ is the maximum refractive index delta of the outer core segment 20B (relative to pure silica) and $\Delta_2$ is the refractive index delta of the low index ring layer 53. In this embodiment the low index ring 53 has a ring width Wr of $R_2-R_1$ and a minimum relative refractive index $\Delta r_{MIN} = \Delta_{2MIN}$. Preferably $\Delta_{2MIN}$ is between −0.1 and −0.7% (relative to pure silica), more preferably between −0.2% and −0.5%. The ring width Wr is preferably between 2 to 8 μm, more preferably between 4 to 6 μm.

The fourth embodiment shown in FIG. 1 (right hand side) is similar to the second embodiment, but core 20 of the fourth fiber embodiment includes tree (3) core segments—a central core region 20A, an inner core segment 20B and an outer core segment 20C.

In this embodiment the relative refractive index deltas of these two segments 20B and 20C are smaller than that of the central core region 20A, and higher than that of the low index ring 53. More specifically, the relative refractive index delta $\Delta_{1B}$ of the inner core segment 20B is smaller than the relative refractive index delta $\Delta_{1C}$ of the outer core segment 20C. However, the minimum relative refractive index delta $\Delta_{1MIN}$ of the core segments surrounding the central core segment 20A (which in this embodiment corresponds to $\Delta_{1B}$ of the inner cladding region 20B) is higher than that of the low index ring 53. Thus, in this embodiment, $\Delta_{1MIN} > \Delta_{2MIN}$ (or $\Delta_{1B} > \Delta_{2MIN}$).

In the embodiments shown in FIG. 1 the cross-section of the refractive index profile of the low index ring 53 is rectangular, but the relative refractive index profile of the low index ring can be of other shapes, like triangular or parabolic for additional mode-field control in the fiber design.

In some embodiments the coating 60 may include a primary coating 62 contacting and surrounding the outer annular cladding region, and a secondary coating 64. These coatings, when used in conjunction with the optical fibers disclosed herein help achieve MPI (multi-pass interference) to less than −30 dB at a wavelength of 1550 nm. The outer radius of the core 20 is $R_1$ and the outer radius of the cladding 50 is $R_{outer}$. In some embodiments the primary coating 62 has an in situ modulus of less than 0.35 MPa, preferably less than 0.3 MPa, more preferably not more than 0.2 MPa, for example, between about 0.05 MPa and about 0.2 MPa. Primary coating 62 preferably has an in situ glass transition temperature $T_g$ lower than the lowest projected use temperature of the coated optical fiber. In some embodiments the primary coating 62 has an in situ glass transition temperature less than −35° C., preferably less than −40° C., and in some embodiments not more than −50° C. For example, $T_g$ between about −100° C. and about −35° C. A primary coating with a low in situ modulus reduces the microbending which is the coupling mechanism between the modes propagating in the fiber. A low in situ glass transition temperature ensures that the in situ modulus of the primary coating will remain low even when the fiber is deployed in very cold environments. The microbending performance will therefore be stable with temperature, and this stability results in low mode coupling in all situations and thus better MPI.

Coating 62 is preferably formed from a soft crosslinked polymer material having a low in situ modulus (e.g., less than about 0.35 MPa at 25° C.) and a low in situ $T_g$ (e.g., less than about −35° C. A number of suitable primary coating compositions are disclosed, for example in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. Nos. 7,010,206 and 7,221,842 to Baker et al., and U.S. Pat. No. 7,423,105 to Winningham, each of which is incorporated herein by reference in its entirety.

The primary coating 62 preferably has a higher refractive index than the cladding 50 of the optical fiber 10, in order to allow it to strip errant optical signals away from the core of optical fiber. For example, an exemplary transmission optical fiber 10 may have refractive index values at a wavelength of 1550 nm for the core and cladding of 1.447 and 1.436, respectively; as such, it is desirable that the refractive index of primary coating 62 be greater than 1.44 at 1550 nm. The primary coating 62 maintains adequate adhesion to the glass fiber during thermal and hydrolytic aging, yet (if needed) is capable of being strippable therefrom for splicing purposes. The primary coating 62 typically has a thickness in the range of 20-50 μm (e.g., about 25 or 32.5 μm). The primary coating 62, if needed, can be applied to the optical fiber as a liquid and cured.

The secondary coating 64 is an outer coating and it contacts and surrounds the primary coating 62. In some embodiments the secondary coating 64 has an in situ modulus of greater than 1200 MPa, preferably greater than 1300 MPA. A secondary coating with a high in situ modulus reduces the microbending which is the coupling mechanism between the modes propagating in the fiber. The outer coating material 64 is, for example, the polymerization product of a coating composition whose molecules become highly cross-linked when polymerized. In the embodiments described herein coating 64 has a high in situ modulus (e.g., greater than about 1200 MPa at 25° C.) and a high $T_g$ (e.g., greater than about 50° C.). The in situ secondary modulus is preferably greater than about 1300 MPa, more preferably greater than about 1500 MPa. The in situ $T_g$ of the secondary coating is preferably between about 50° C. and about 120° C., more preferably between about 50° C. and about 100° C. The secondary coating 64 has a thickness that is less than about 40 μm, more preferably between about 20 to about 40 μm, most preferably between about 20 to about 30 μm.

The optical fibers of the present invention can be prepared using conventional draw tower technology for the preparation of the glass fiber and coatings thereof. Briefly, the process for making a coated optical fiber in accordance with the invention involves fabricating glass fiber with its core and cladding having the desired configuration, coating the glass fiber.

In some embodiments the theoretical cut off wavelength of $LP_{11}$ mode is not less than 2200 nm (e.g., greater than 2250 nm and less than 4500 nm). In some embodiments the cut off wavelength of the $LP_{02}$ mode is less than 1800 nm, and the theoretical cut off wavelength of the $LP_{11}$ mode is not less than 2200 nm (e.g., greater than 2250 nm and less than 4500 nm). Some of the fiber embodiments described herein a matched $LP_{01}$ and $LP_{11}$ group delays at 1550 nm. That is, both modes arrive at the output of the fiber at essentially the same time—i.e., the difference in group delay between these modes is less than ±100 ps/km for all wavelengths between 1530 nm and 1565 nm, and in the following embodiments less than ±50 ps/km at 1550 nm. For example, less than 25 ps/km or less than 15 ps/km, and preferably 0 to 10 ps/km at 1550 nm. In some embodiments the difference in group delay between these modes equal to or less than 0.5 ns/km, and in some embodiments not greater than 0.3 ns/km at for all wavelengths between 1530 nm and 1565 (e.g., ≤0.1 ns/km at 1550 nm, or ≤0.05 ns/km at 1550 nm). In some embodiments the difference in group delay between these modes is less than 0.3 ns/km at 1550 nm (e.g., ≤0.1 ns/km at 1550 nm). In some embodiments the difference in group delay between these modes is less than 0.3 ns/km at for all wavelengths between 1530 nm and 1565 nm (e.g., ≤0.1 ns/km at 1550 nm). In some embodiments the difference in group delay between these modes ($LP_{01}$ and $LP_{11}$) is less than 0.3 ns/km for all wavelengths between 1530 nm and 1565 nm (e.g., ≤0.1 ns/km for 1530 nm≤λ≤1565 nm).

EXEMPLARY EMBODIMENTS

Fiber Examples 1-17

Table 1 illustrates the properties of four exemplary optical fibers 10 with a refractive index profiles and corresponding to the cross-section of the fiber illustrated on the left hand side of FIG. 1. That is, fibers 10 of these embodiments include a step-index core 20 (flat delta, $\Delta_0=0$) with the radius $R_1$ and a glass cladding 50 surrounding the core 20. Fibers 10 of these four embodiments have a three Segment Fiber Profile (pure silica core 20, a low index ring cladding layer 53, and an outer cladding 54). In these fiber embodiments the core 20 is a few moded core, and it supports 3 modes (i.e., X=3). In these four exemplary optical fibers 10 the low index ring 53 is directly adjacent to the core 20, and in contact with the core and an outer cladding 54. The core 20 of these exemplary fibers 10 is pure silica, and the relative refractive index deltas of the cladding layers are calculated relative to the refractive index of the core. The cladding 50 has a (outer) radius of the $R_{outer}=6.25$ μm. More specifically, in these four embodiments the $LP_{02}$ mode cut off wavelength λcutoff is at or below 1.52 μm (e.g., 1.48 μm≤λcutoff≤1.51 μm, and more preferably at or below 1.5 μm). These four exemplary fiber embodiments have unmatched $LP_{01}$ and $LP_{11}$ group delays at 1550 nm. In these embodiments the $LP_{01}$ fiber attenuation is less than 0.18 dB/km—i.e., much smaller than that of fibers with Ge doped core. In some embodiments the $LP_{01}$ fiber attenuation is between 0.15 and 0.17 dB/km.

TABLE 1

| | Core radius $R_1$ (μm) | Ring width Wr (μm) | Ring delta (%) Δrmin | Outer cladding delta (%) | $LP_{02}$ cutoff (μm) | $LP_{11}$ cutoff (μm) | pin array bend loss ($LP_{01}$) dB | effective area ($LP_{01}$) um² | $LP_{01}$ group index at 1550 nm |
|---|---|---|---|---|---|---|---|---|---|
| Example 1 | 8.4 | 18 | −0.3 | −0.275 | 1.487 | 2.353 | 0.2 | 163 | 1.4676 |
| Example 2 | 8.6 | 40 | −0.35 | −0.275 | 1.499 | 2.369 | 0.7 | 185 | 1.4672 |
| Example 3 | 9.3 | 40 | −0.30 | −0.275 | 1.498 | 2.367 | 3 | 215 | 1.4666 |

Table 2 illustrates the properties an exemplary optical fiber 10 (Example 4) with a refractive index profiles and corresponding to the second left cross-section of the fiber of FIG. 1. Fiber 10 of this embodiment has a four Segment Fiber Profile (pure silica core segment 20A, an outer core segment 20B, and the low index ring 53 situated between the inner cladding region 52 and an outer cladding 54). In this fiber embodiment the core 20 is a few moded core (flat delta, $\Delta_0=0$), and supports 3 modes (i.e., X=3). In this embodiment (fiber examples 4) the relative refractive index deltas of the cladding layers are calculated relative to the refractive index of the core segment 20A, which in these embodiments is made of pure silica. The glass cladding 50 has an outer radius $R_{outer}=62.5$ μm. This exemplary fiber embodiment has a matched $LP_{01}$ and $LP_{11}$ group delays at 1550 nm. That is, both modes arrive at the output of the fiber at essentially the same time. More specifically, for the fiber example 4 of Table 2 the difference between the $LP_{01}$ and $LP_{11}$ group delays at 1550 nm is calculated to be 0 ns/km. In this embodiment the $LP_{01}$ fiber attenuation is less than 0.18 dB/km—i.e., much smaller than that of fibers with Ge doped core. Also, in this embodiment the cut off wavelength of the $LP_{02}$ mode is less than 1800 nm and the theoretical cut off wavelength of the $LP_{11}$ mode is greater than 2200 nm. In Table 2 the radial width (μm) of outer core 20B is the difference between the core radius $R_1$ and the radius $R_0$ of the central core segment ($R_1-R_0$).

corresponding to the third from left fiber cross-section illustrated on the in FIG. 1. Fibers 10 of these embodiments have a four Segment Fiber Profile (pure silica core segment 20A, the inner core segment 20B with a tapered refractive index profile, the low index ring 53 situated directly adjacent to the core segment 20B, and the outer cladding 54). In these fiber embodiments the core 20 (flat delta, $\Delta_0=0$) is a few moded core, and supports 3 modes (i.e., X=3). In this embodiment the relative refractive index deltas of the cladding layers are calculated relative to the refractive index of the core segment 20A. The glass cladding 50 has a (outer) radius of the $R_{outer}=62.5$ μm. This exemplary fiber embodiment has a matched $LP_{01}$ and $LP_{11}$ group delays at 1550 nm. That is, both modes arrive at the output of the fiber at essentially the same time. In these embodiments the difference in group delay between $LP_{01}$ and $LP_{11}$ group modes is less than 0.3 ps/km the wavelengths between 1525 and 1565 nm). In this embodiments the $LP_{01}$ fiber attenuation is less than 0.18 dB/km—i.e., much smaller than that of fibers with Ge doped core. In these two embodiments, as in the previous embodiments, the cut off wavelength of the $LP_{02}$ mode is less than 1800 nm and the

TABLE 2

| Radius $R_0$ (μm) of the central core region 20A | Radial width (μm) of outer core 20B | Outer core delta (%) | Ring radial width (μm) | Ring delta (%) Δrmin | Outer cladding delta (%) | $LP_{02}$ cut-off (um) | $LP_{11}$ cut-off (um) | pin array bend loss ($LP_{01}$) dB | effective area ($LP_{01}$) um² | $LP_{01}$ (and $LP_{11}$) group index at 1550 nm |
|---|---|---|---|---|---|---|---|---|---|---|
| 7.3 | 7.9 | −0.2 | 13 | −0.45 | −0.275 | 1.50 | 2.257 | 0.7 | 176 | 1.467 |

Table 3 illustrates the properties two exemplary optical fibers 10 (Example 6 and 7) with a refractive index profile the theoretical cut off wavelength of the $LP_{11}$ mode is greater than 2200 nm (and preferably greater than 2250 nm).

TABLE 3

| Radius $R_0$ (μm) of the central core region 20A | Radial width (μm) of outer core | Outer core delta (%) | Ring radial width (μm) | Ring delta (%) Δrmin | Outer cladding delta (%) | $LP_{02}$ cutoff (um) | $LP_{11}$ cutoff (um) | pin array bend loss ($LP_{01}$) dB | Effective Area ($LP_{01}$) um² | $LP_{01}$ (and $LP_{11}$) group index at 1550 nm |
|---|---|---|---|---|---|---|---|---|---|---|
| 5.0 | 14.1, | −0.01 | 14.1 | −0.45 | −0.275 | 1.500 | 2.270 | 0.6 | 182 | 1.46687 |
| 6.87 | 16.5 | −0.12 | 16.5 | −0.45 | −0.275 | 1.500 | 2.291 | 0.5 | 178 | 1.46698 |

Table 4 illustrates the properties five exemplary optical fibers 10 (Example 8-12) with a refractive index profile the corresponding to the right most fiber illustrated on the in FIG. 1. Fibers 10 of these embodiments have a five Segment Fiber Profile (pure silica core segment 20A, the inner core segment 20B, the outer core segment 20C, and the low index ring 53 situated between the outer core segment 20C, and an outer cladding 54). In these fiber embodiments the core 20 is a few moded core, and supports 3 to 6 LP modes (i.e., 3≤X≤6). The $LP_{02}$ cutoff wavelength in these embodiments is between 1550 nm and 2310 nm, while the $LP_{11}$ cut off wavelength is between 2000 nm and 2500 nm. In these embodiment the relative refractive index deltas of the core segments 20B, 20C, and embodiment the relative refractive index deltas of the cladding layers are calculated relative to the refractive index of the core segment 20A. The core segment 20A has a flat delta ($\Delta_0$=0%). The glass cladding 50 has a (outer) radius of the $R_{outer}$=6.5 μm. These exemplary fiber embodiments have a matched $LP_{01}$ and $LP_{11}$ group delays at 1550 nm. That is, both modes arrive at the output of the fiber at essentially the same time (difference in group delay between these modes in the embodiments is less than 50 ps/km, for example less than 25 ps/km at 1550 nm). More specifically, in these embodiments the group delay is calculated to be 0 ps/km at 1550 nm and less than 3 ps/km for the wavelength range of 1530 to 1565 nm. In these examples $LP_{01}$ mode fiber attenuation is less than 0.18 dB/km at 1550nm—i.e., much smaller than that of fibers with Ge doped core.

Table 5, below, discloses modeled data for the five exemplary optical fibers 10 (examples 13-17) that have refractive index profiles shown in FIGS. 2-6. These embodiments have cores 20 that include alkali, for example $K_2O$. The cladding 50 is downdoped relative to the core and includes Fluorine. However boron may also be utilized. These fiber embodiments have LP modes in wavelength above 1500 nm (in C-band). When orthogonal modes are excited the number of modes and hence the number of channels can be further increased which will help to increase the transmission capacity. For example for $LP_{11}$ mode, the three orthogonal components (LP11x, LP11y, and LP11x+y) can be excited individually. In that case fiber example 13 can behave as a 4 moded fiber. Fiber example 17 is designed with a graded-index structure to minimize differential group delays (DMD). Lower DMDs help to achieve tractable multiple-input multiple-output (MIMO) signal processing which enables high-reliability communications links. These designs have higher effective areas to reduce non-linear effects. The effective area Aeff for these embodiments ranges from about 155 to 225 μm². All of these fiber embodiments have low loss (<0.170 dB/km).

TABLE 4

| Radius $R_0$ (μm) of the central core region 20A | radial width (μm) of segment 20B | delta (%) min of segment 20B | radial width (μm) of segment 20C | delta (%) min of segment 20C | Ring radial width (μm) | Ring delta (%) Δrmin | Outer cladding delta (%) | $LP_{02}$ cutoff (um) | $LP_{11}$ cutoff (um) | pin array bend loss ($LP_{01}$) dB | Effective Area ($LP_{01}$) um² | $LP_{01}$ (and $LP_{11}$) group index at 1550 nm |
|---|---|---|---|---|---|---|---|---|---|---|---|---|
| 7.25 | 5.46 | −0.185 | 3.88 | −0.265 | 13 | −0.45 | −0.275 | 1.500 | 2.270 | 0.7 | 176 | 1.4670 |
| 7.18 | 5.20 | −0.176 | 3.76 | −.261 | 13 | −0.45 | −0.275 | 1.500 | 2.23 | 0.7 | 177 | 1.4670 |
| 7.11 | 3.74 | −0.192 | 1.61 | 0.0 | 13 | −0.45 | −0.275 | 1.500 | 2.21 | 0.8 | 176 | 1.4670 |
| 8.25 | 4.65 | −0.129 | 2.6 | 0.0 | 15.5 | −0.463 | −0.319 | 2.307 | 3.363 | 0.044 | 252.26 | 1.4675 |
| 7.19 | 3.91 | −0.137 | 1.93 | 0.0 | 13.02 | −0.4 | −0.25 | 1.608 | 2.341 | 1.9 | 210.1 | 1.4665 |

TABLE 5

|  | Example 13 | Example 14 | Example 15 | Example 16 | Example 17 |
|---|---|---|---|---|---|
| MFD1550 | 14.07 | 15.95 | 14.37 | 12.30 | 16.68 |
| Aeff1550 | 156.39 | 207.55 | 168.70 | 122.05 | 222.94 |
| D1550 | 21.55 | 22.26 | 22.45 | 21.81 | 22.43 |
| slope | 0.0625 | 0.0629 | 0.0633 | 0.0610 | 0.0646 |
| LP01 Cutoff | 5000 | 5000 | 5000 | 5000 | 5000 |
| LP11 Cutoff | 2037 | 1828 | 4162 | 1619 | 2800 |
| LP02 Cutoff | 1357 | 1152 | 4004 | 1022 | 1795 |
| Attenuation1550 | 0.165 | 0.170 | 0.167 | 0.162 | 0.170 |
| #modes above 1500 nm | 2 | 2 | 2 | 2 | 2 |
| ro (outer radius of core region 20A) | 1.900 | 1.900 | 1.940 | 1.900 | 3.325 |
| r1 (outer radius of core region 20B) | 7.560 | 9.125 | 8.870 | 6.675 | 14.750 |
| r2 (ring radius) | 27.940 | 22.030 | 33.840 | 22.030 | 14.750 |
| $\Delta_0$ (%) segment 20A | 0.050 | 0.000 | 0.030 | 0.000 | 0.000 |
| $\Delta 1$, segment 20B (%) | −0.066 | −0.080 | −0.080 | −0.080 | −0.085 |
| $\Delta 2$ = Δrmin (%) | −0.300 | −0.278 | −0.340 | −0.380 | −0.380 |
| $\Delta 3$ = Outer cladding delta (%) | −0.275 | −0.260 | −0.300 | −0.350 | −0.350 |
| $\Delta 2$ min − $\Delta 3$ | −0.085 | −0.020 | −0.050 | −0.030 | −0.030 |

What is claimed is:

1. A few mode n optical fiber comprising:
   a. a Ge-free core having an effective area Aeff of $LP_{01}$ mode such that 120 μm² < Aeff < 1000 μm² at 1550 nm, and a refractive index profile selected such that (a) the core is capable of supporting the propagation and transmission of an optical signal with X number of LP modes at a wavelength of 1550 nm, wherein X is an integer greater than 1 and not greater than 20, and (b) maximum refractive index delta of the core, $\Delta_0$ in % measured relative to pure $SiO_2$, wherein $-0.5\% \leq \Delta_0 \leq 0.08\%$; and
   b. an annular cladding surrounding the core, said annular cladding having a low index ring with a minimum refractive index delta $\Delta r_{MIN}$, where (a) $\Delta r_{MIN} < \Delta_0$ and (b) $\Delta r_{MIN} \leq -0.3$ measured relative to pure $SiO_2$, and an outer cladding with a refractive index delta $\Delta_{Outer-Clad}$ relative to pure silica, such that $\Delta_{Outer-Clad} > \Delta r_{MIN}$; and the difference between the relative refractive index of the core $\Delta_0$ and the outer cladding $\Delta_{Outer-Clad}$ is $|\Delta_0 - \Delta_{Outer-Clad}| > 0.05\%$, and
   wherein the relative refractive index profile of the few mode optical fiber is selected to provide attenuation of less than 0.18 dB/km at the 1550 nm wavelength, and $LP_{11}$ cut off wavelength is greater than 1600 nm.

2. The few mode optical fiber according to claim 1 wherein the core provides a difference in effective indices between $LP_{01}$ and $LP_{11}$ modes of more than $10^{-4}$.

3. The few mode optical fiber according to claim 1, wherein Aeff of $LP_{01}$ mode is not less than 150 μm² at 1550 nm.

4. The few mode optical fiber according to claim 1 wherein the difference in $LP_{02}$ and $LP_{11}$ cut off wavelengths is greater than 500 nm.

5. The few mode optical fiber according to claim 4 wherein the difference in $LP_{02}$ and $LP_{11}$ cut off wavelengths is greater than 600 nm.

6. The few mode optical fiber according to claim 5 wherein the difference in $LP_{02}$ and $LP_{11}$ cut off wavelengths is greater than 700 nm.

7. The few mode optical fiber according to claim 2 wherein the difference in $LP_{02}$ and $LP_{11}$ cut off wavelengths is greater than 500 nm.

8. A few mode optical fiber comprising:
   (i) a Ge-free step index core having an effective area Aeff of $LP_{01}$ mode 120 μm² < Aeff < 1000 μm² at 1550 nm, and a refractive index profile selected such that (a) the core is capable of supporting the propagation and transmission of an optical signal with X number of LP modes at a wavelength of 1550 nm, wherein X is an integer greater than 1 and not greater than 20,
   (b) a difference in effective indices between $LP_{01}$ and $LP_{11}$ modes of more than $10^{-4}$, and (c) maximum refractive index delta of the core, $\Delta_0$ in % measured relative to pure $SiO_2$, wherein $-0.5\% \leq \Delta_0 \leq 0.08\%$;
   (ii) an annular cladding surrounding the core, said annular cladding having a low index ring with a minimum refractive index delta $\Delta r_{MIN}$, where $\Delta r_{MIN} < \Delta_0$ and $\Delta r_{MIN} \leq -0.3$ measured relative to pure $SiO_2$, and an outer cladding with a refractive index delta $\Delta_{Outer-Clad}$ relative to pure silica, such that
   $\Delta_{Outer-Clad} > \Delta r_{MIN}$ and the difference between the relative refractive index of the core $\Delta_0$ and the outer cladding $\Delta_{Outer-Clad}$ is $|\Delta_0 - \Delta_{Outer-Clad}| > 0.05\%$, and wherein the relative refractive index profile of the few mode optical fiber is selected to provide attenuation of less than 0.18 dB/km at the 1550 nm wavelength, and $LP_{11}$ cut off wavelength is greater than 1600 nm.

9. A few mode optical fiber comprising:
   (i) a Ge-free multi-segment core having an effective area Aeff of $LP_{01}$ mode 120 μm² < Aeff < 1000 μm² at 1550 nm, and a refractive index profile selected such that (a) the core is capable of supporting the propagation and transmission of an optical signal with X number of LP modes at a wavelength of 1550 nm, wherein X is an integer greater than 1 and not greater than 20, (b) a difference in effective indices between $LP_{01}$ and $LP_{11}$ modes of more than $10^{-4}$, and (c) maximum refractive index delta of the core, $\Delta_0$ in % measured relative to pure $SiO_2$, wherein $-0.5\% \leq \Delta_0 \leq 0.05\%$;
   (ii) an annular cladding surrounding the core, said annular cladding having a low index ring with a minimum refractive index delta $\Delta r_{MIN}$, where $\Delta r_{MIN} < \Delta_0$ and $\Delta r_{MIN} < -0.3$ measured relative to pure $SiO_2$, and an outer cladding with a refractive index delta $\Delta_{Outer-Clad}$ relative to pure silica, such that
   $\Delta_{Outer-Clad} > \Delta r_{MIN}$ and the difference between the relative refractive index of the core $\Delta_0$ and the outer cladding $\Delta_{Outer-Clad}$ is $|\Delta_0 - \Delta_{Outer-Clad}| > 0.05\%$, and wherein the relative refractive index profile of the few mode optical fiber is selected to provide attenuation of less than 0.18 dB/km at the 1550 nm wavelength, and $LP_{11}$ cut off wavelength is greater than 1600 nm.

10. The optical waveguide fiber according to claim 1 wherein at least a portion of the central core region is made of pure silica.

11. The optical waveguide fiber according to claim 1, wherein said low index ring is doped with 0.5% wt % to 2 wt % fluorine.

12. The optical waveguide fiber according to claim 1, wherein the core alpha is less than 1.5, or $12 \leq \alpha \leq 25$.

13. The optical fiber according to claim 1, wherein said core comprises:
   a radius $r_c$ from about 4.5 μm to about 15 μm; $2 \leq X \leq 10$
   a maximum relative refractive index $\Delta_{1MAX}$ from about 0.2% to about 0.55% relative to the glass cladding;
   an LP01 effective area greater than about 150 μm² and less than about 250 μm², a theoretical cutoff wavelength of the LP02 mode is less than about 1800 nm.

14. The optical fiber according to claim 2, wherein the MPI is less than −30 dB at a wavelength of 1550 nm.

15. The optical fiber according to claim 2, wherein the differential delay between the LP01 and LP11 modes is less than about 0.5 ns/km at a wavelength of 1550 nm.

16. The optical fiber according to claim 2, wherein a theoretical cutoff of an LP11 mode is greater than 2.15 μm at a wavelength of 1550 nm.

17. The optical fiber of claim 2, wherein said optical fiber has an LP01 attenuation of <0.22 dB/km.

18. The optical fiber of claim 2, wherein said optical fiber has an LP11 attenuation of <0.25 dB/km.

19. The optical fiber of claim 2, wherein
   an LP01 effective area greater than about 110 μm² and less than about 210 μm², a theoretical cutoff wavelength of the LP02 mode is less than about 1800 nm; and
   said glass cladding comprises a maximum relative refractive index $\Delta_{4MAX}$ such that $\Delta_{1MAX} > \Delta_{4MAX}$.

20. The optical fiber of claim 11, wherein the MPI is less than −30 dB at a wavelength of 1550 nm.

21. The optical fiber according to claim 11, wherein the differential delay between the LP01 and LP11 modes is less than about 0.5 ns/km at a wavelength of 1550 nm.

* * * * *